United States Patent
Ikemoto et al.

(10) Patent No.: US 9,065,364 B2
(45) Date of Patent: Jun. 23, 2015

(54) MOTOR CONTROL DEVICE (75) Inventors: Katsuya Ikemoto, Chiyoda-ku (JP);
Chiaki Fujimoto, Chiyoda-ku (JP);
Shunichi Wada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 13/983,198

(22) PCT Filed: May 26, 2011

(86) PCT No.: PCT/JP2011/062099
§ 371 (c)(1),
(2), (4) Date: Aug. 1, 2013

(87) PCT Pub. No.: WO2012/160694
PCT Pub. Date: Nov. 29, 2012

(65) Prior Publication Data
US 2013/0307448 A1 Nov. 21, 2013

(51) Int. Cl.
*H02P 3/02* (2006.01)
*B62D 5/04* (2006.01)
(Continued)

(52) U.S. Cl.
CPC ............... *H02P 3/02* (2013.01); *B62D 5/0487* (2013.01); *H02P 27/08* (2013.01); *H02P 29/026* (2013.01); *H02P 21/06* (2013.01); *H02P 21/0096* (2013.01)

(58) Field of Classification Search
CPC ...... B62D 5/046; B62D 5/0487; B62D 5/049; B62D 5/0496; B62D 5/0481; H02M 3/1588; H02M 2001/007; H02M 7/48; H02P 6/10; H02P 6/18; H02P 27/02
USPC ........ 318/400.02, 400.33, 432, 434; 180/443, 180/446; 701/32.8
See application file for complete search history.

(56) References Cited

U.S. PATENT DOCUMENTS 6,060,859 A * 5/2000 Jonokuchi ..................... 318/801
6,334,625 B1 1/2002 Pausch et al.
(Continued)

FOREIGN PATENT DOCUMENTS

JP 2004-338619 A 12/2004
JP 2005-193751 A 7/2005
(Continued)

OTHER PUBLICATIONS

Japanese Office Action, issued Apr. 15, 2014 in Patent Application No. 2013-516147.
(Continued)

*Primary Examiner* — Paul Ip
(74) *Attorney, Agent, or Firm* — Sughrue Mion, PLLC; Richard C Turner (57) ABSTRACT

An object is to provide a specific achievement means for achieving reliable failure determination in a control system in a motor control device.

The motor control device includes motor drive means for supplying a motor current to a motor; motor current detection means for detecting the motor current; and a controller to which a motor current detection value from the motor current detection means is input, and which outputs a drive signal to the motor drive means, in which the controller includes voltage control means for controlling a voltage applied to the motor; power supply voltage detection means; means for limiting the maximum value (%) of a drive duty ratio in a PWM circuit to a smaller value, upon determining power supply voltage drop; and failure determination means for determining a failure in a case of an abnormal motor current value.

7 Claims, 8 Drawing Sheets

(51) Int. Cl.
*H02P 27/08* (2006.01)
*H02P 29/02* (2006.01)
*H02P 21/06* (2006.01)
*H02P 21/00* (2006.01)

(56) References Cited

U.S. PATENT DOCUMENTS

| | | | |
|---|---|---|---|
| 6,837,331 B2 * | 1/2005 | Kawada et al. | 180/446 |
| 7,129,663 B2 * | 10/2006 | Suzuki | 318/504 |
| 7,157,874 B2 * | 1/2007 | Nomura et al. | 318/432 |
| 7,740,103 B2 * | 6/2010 | Sasajima | 180/443 |
| 8,022,651 B2 * | 9/2011 | Kifuku | 318/434 |
| 2004/0154859 A1 * | 8/2004 | Kawada et al. | 180/446 |
| 2006/0055351 A1 * | 3/2006 | Suzuki | 318/432 |
| 2006/0181819 A1 * | 8/2006 | Nomura et al. | 361/31 |
| 2008/0236934 A1 * | 10/2008 | Sasajima | 180/446 |
| 2009/0250289 A1 * | 10/2009 | Kifuku | 180/446 |
| 2013/0218403 A1 * | 8/2013 | Abe et al. | 701/32.8 |

FOREIGN PATENT DOCUMENTS

| | | |
|---|---|---|
| JP | 2009-136093 A | 6/2009 |
| WO | 98/58823 A1 | 12/1998 |
| WO | 98/58833 A1 | 12/1998 |

OTHER PUBLICATIONS

International Search Report of PCT/JP2011/062099 dated Aug. 16, 2011.

* cited by examiner

MOTOR CONTROL DEVICE

TECHNICAL FIELD

The present invention relates to a motor control device used in an in-vehicle electric power steering control device, and particularly to a motor control device for efficiently determining a failure due to abnormality in a motor current detection value.

BACKGROUND ART

In this type of motor control device in the related art, the one has been proposed which determines a failure condition when a current deviation between a measured motor current detection value and stored motor current command value exceeds a predetermined determination threshold value, and thereby blocks a motor output by setting the motor current command value to "zero" (for example, refer to PTL 1 and PTL 2).

In the motor control device disclosed in the above-described Patent Literature in the related art, even if there is the failure condition, such as a short circuit failure in armature winding and a ground failure in wiring between the control device and a motor, when power supply voltage drop resulting from voltage fall due to an abnormal current upon the failure is less, if there is a sufficient voltage value required for operating an in-vehicle electric power steering control device, it is still possible to identify a normal driving condition and the failure condition.

CITATION LIST

Patent Literature
[PTL 1] JP-B-6-29031
[PTL 2] JP-A-2006-76332

SUMMARY OF INVENTION

Technical Problem

However, in a motor control device in the related art, when a failure condition causes an overcurrent to flow, and a power supply voltage is decreased to a power supply voltage value or less required for operating an in-vehicle electric power steering device due to a voltage effect thereof, it is not easy to identify a normal driving condition and an abnormal driving condition. Accordingly, there is a case where a failure may cause circuit components of the motor control device to be broken, or a case where determination of the failure may be stopped from deciding that the voltage is beyond a voltage range where the failure condition can be detected, or a case where the determination of the failure may not be performed correctly and immediately. These phenomena have become a more serious and important issue in that an overcurrent value in the failure condition is progressively increased as in-vehicle motors recently come to have a large current.

The present invention is made in order to solve the above-described problems, and aims to obtain the motor control device which prevents stoppage in determining the failure due to the decreased power supply voltage resulting from the overcurrent flowing in the failure condition such as the short circuit failure in the armature winding and the ground failure in the wiring between the control device and the motor, and which provides adequate protection for the circuit elements.

Solution to Problem

The in-vehicle motor control device according to the present invention includes motor drive means for supplying a motor current to a motor; motor current detection means for detecting the motor current; and a controller to which a motor current detection value from the motor current detection means is input and which outputs a drive signal to the motor drive means; a power supply voltage detection means, a voltage control means for controlling a voltage applied to the motor; means for limiting the maximum value (%) of a drive duty ratio in a PWM circuit to a smaller value than usual, upon determining power supply voltage drop; and failure determination means for determining a failure in a case of an abnormal motor current value.

Advantageous Effects of Invention

According to the present invention, it is possible to prevent stoppage in determining operation of the failure due to the decreased power supply voltage resulting from the overcurrent in a case where the overcurrent flows during the failure condition of a motor, and to adequately protect the circuit elements by performing reliable determination of the failure.

DESCRIPTION OF EMBODIMENTS

Embodiment 1

Figure 1:
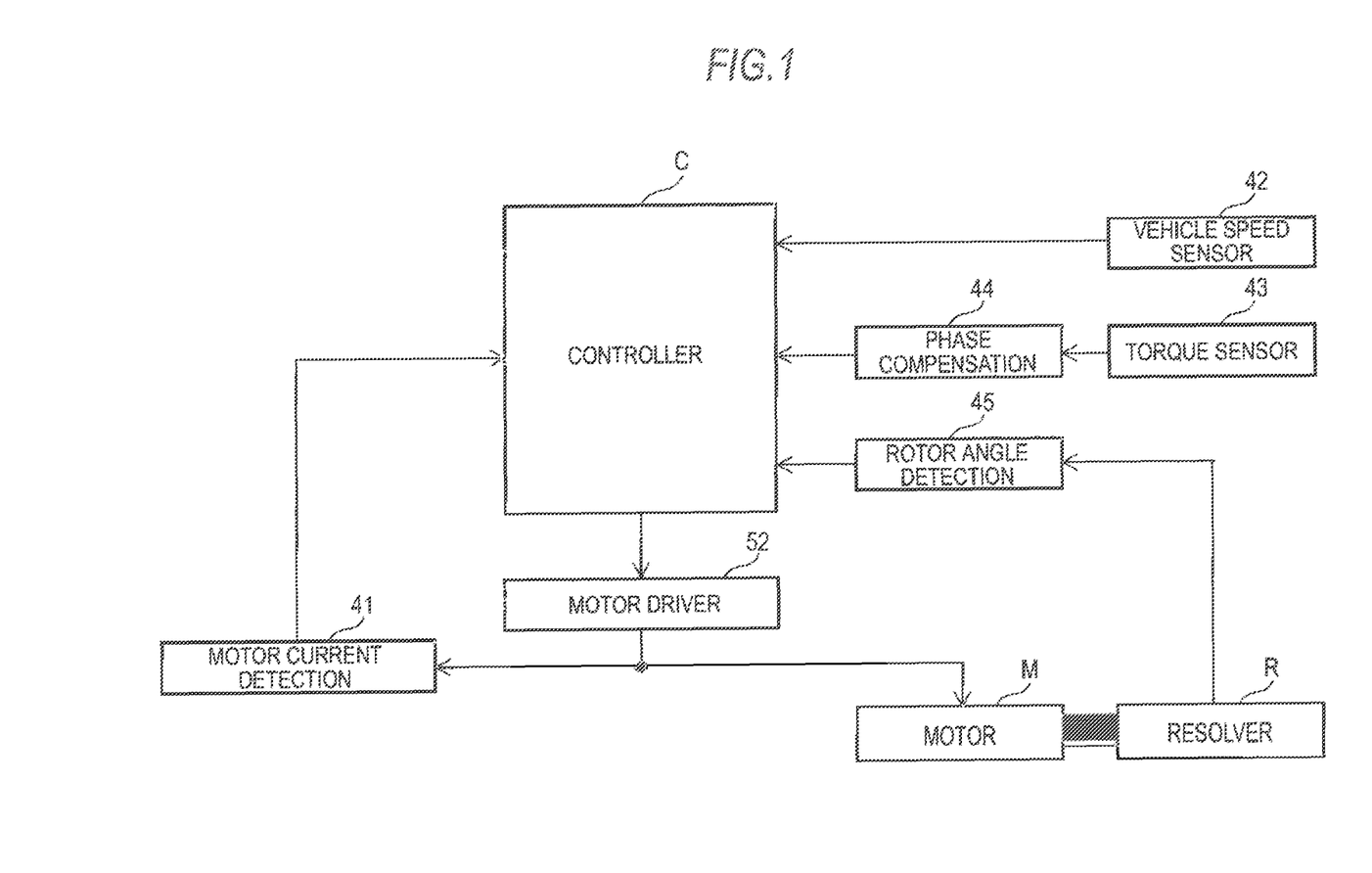
FIG. 1 is a view illustrating a relationship between a motor controlling a general electric power steering control device and a controller controlling the motor.
Figure 2:
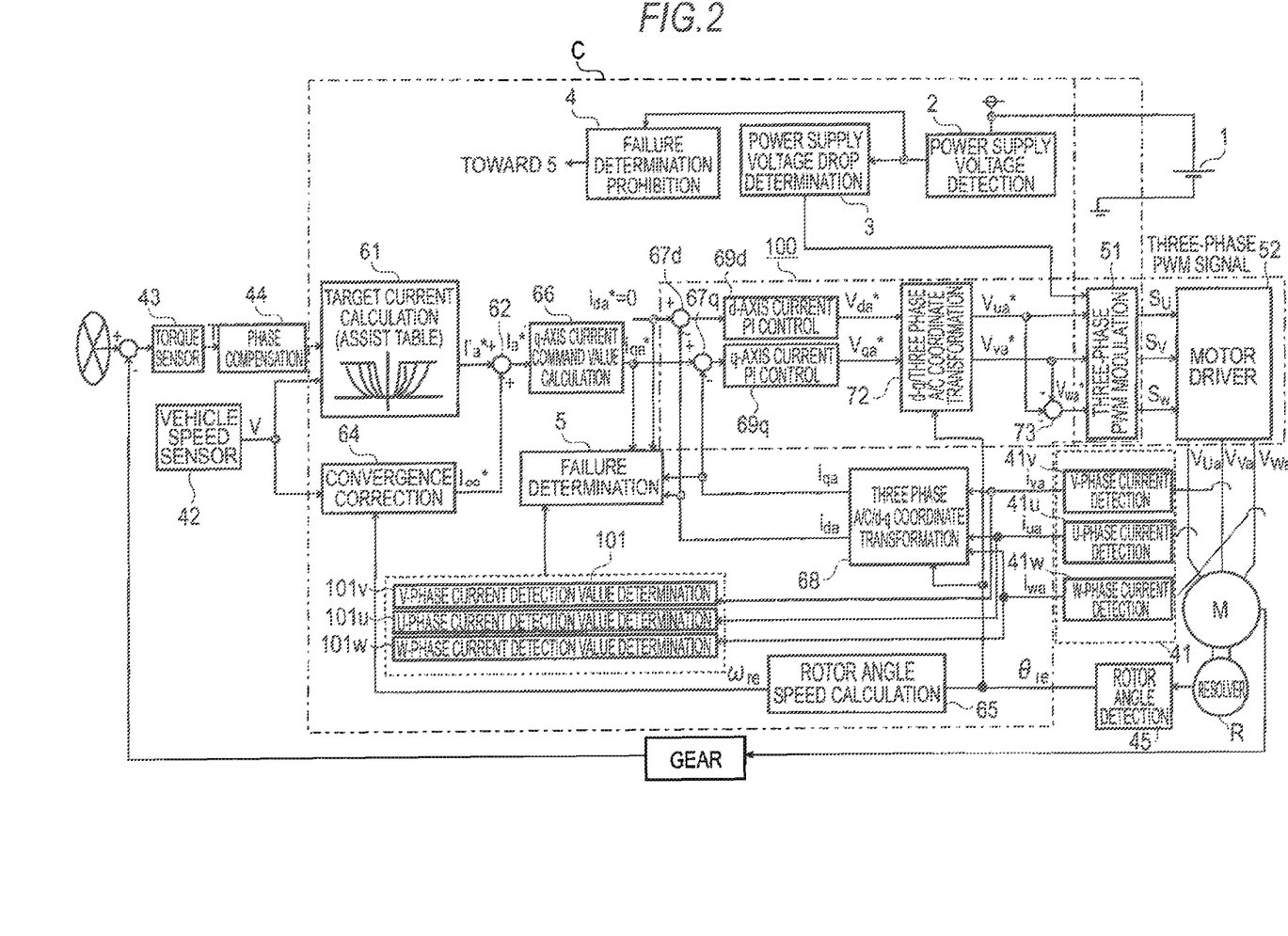
FIG. 2 is a block diagram illustrating a detailed circuit configuration of FIG. 1.

FIG. 1 illustrates a general schematic configuration of an in-vehicle electric power steering control device which is a subject of the present invention, and FIG. 2 is a functional configuration diagram illustrating the detail. In the drawings, the same reference numerals are given to the same or corresponding portions.

FIG. 1 illustrates a relationship between a controller inputting a detection value of various sensors and controlling the electric power steering control device and a motor M controlled by the controller C. The motor M is intended to subsidiarily supply a torque to the electric power steering control device, and is driven by a motor driver 52 which the controller C controls.

Furthermore, a vehicle speed V obtained by a vehicle speed sensor 42, a steering torque T which is detected by a torque sensor 43 and phase-compensated through a phase compensation circuit 44, a rotor angle θre of the motor detected by a resolver R and a rotor angle detection circuit 45 which are connected to the motor M, are input to the controller C. In addition, in order to control a voltage applied to the motor M, a motor current detection value detected by a motor current detection unit 41 is input to the controller C.

Next, FIG. 2 will be described. In the motor control device, the vehicle speed V detected by the vehicle speed sensor 42, the steering torque T which is detected by the torque sensor and phase-compensated through the phase compensation circuit 44 are input to the controller C. In addition, the motor control device includes a target current calculation unit 61 for deciding a target current command value I'a* (effective value of three-phase current flowing in a U-phase, V-phase and W-phase) which is a command value of the three-phase current flowing to the motor M.

In order to improve a feeling in steering, the rotor angle. Ore of the motor M, which is detected using the resolver R and the rotor angle detection circuit 45 is transformed into a rotor angle speed ωre via a rotor angle speed calculation unit 65, a convergence correction value ICO* is calculated from the transformed rotor angle speed ωre and the vehicle speed V using a convergence correction unit 64, and the convergence correction value Ico* is provided for an addition unit 62. In the addition unit 62, the target current command value I'a* input from the target current calculation unit 61 and the convergence correction value Ico* input from the convergence correction unit 64 are added to each other, and the target current command value Ia* after the convergence correction is set, which indicates an amplitude of a three-phase current to be provided in a U-phase, V-phase and W-phase of the motor M. Furthermore, in order to enable a current value to be treated as a direct current amount irrelevant to the rotor angle θre of the motor q-axis current command value calculation unit performs a d-q coordinate transformation on the above-described target current command value Ia* after the convergence correction, and sets a q-axis current command value iqa*. On the other hand, the d-axis current command value ida* is set to zero.

A d-axis current command value and the q-axis current command value Iqa* are respectively input to subtraction, units 67d and 67g. For these respective subtraction units 67d and 67q, the d-axis current detection value Ida and the q-axis current detection value Iqa are provided, which can be obtained, via a three-phase A/C/d-q coordinate transformation unit 68, outputs from a U-phase current detection unit 41u for detecting a U-phase current iua actually flowing in a U-phase, V-phase current detection unit. 41v for detecting a V-phase current iva actually flowing in a V-phase, and a W-phase current detection unit 41w for detecting a W-phase current iwa actually flowing in a W-phase of the motor M.

Accordingly, the deviation between the d-axis current command value Ida* and a d-axis current detection value Ida, and the deviation between the q-axis current command value Iqa* and a q-axis current detection value Iqa are respectively output from the subtraction units 67d and 67q. The deviations output from the subtraction units 67d and 67q are respectively provided for a d-axis current PI (proportional integral) control unit 69d and a q-axis current PI control unit 69q to respectively obtain a d-axis voltage command value Vda* and a q-axis voltage command value Vqa*.

The d-axis voltage command value Vda* and the q-axis voltage command value Vqa* which are obtained as described above input to a d-q/three-phase A/C coordinate transformation unit 72. In addition, the rotor angle θre detected by the rotor angle detection circuit 45 has been input to the d-q/three-phase A/C coordinate transformation unit 72. The d-q/three-phase A/C coordinate transformation unit 72 transforms the d-axis voltage command value Vda* and the q-axis voltage command value Vqa* into command values Vua* and Vva* of a three-phase A/C coordinate system according to the following expression (1). Then the obtained U-phage voltage command value Vua* and V-phase voltage command value Vva* are input to a three phase PWM modulation unit 51.

[Expression 1]

$$\begin{bmatrix} V_{va}^* \\ V_{ua}^* \\ V_{wa}^* \end{bmatrix} = \sqrt{\frac{2}{3}} \begin{bmatrix} \cos\theta_{re} & -\sin\theta_{re} \\ \cos\left(\theta_{re} - \frac{2\pi}{3}\right) & -\sin\left(\theta_{re} - \frac{2\pi}{3}\right) \\ \cos\left(\theta_{re} - \frac{4\pi}{3}\right) & -\sin\left(\theta_{re} - \frac{4\pi}{3}\right) \end{bmatrix} \begin{bmatrix} V_{da}^* \\ V_{qa}^* \end{bmatrix} \quad (1)$$

However, a W-phase voltage command value Vwa* is not calculated in the d-q/three-phase A/C coordinate transformation unit 72, but is calculated in a W-phase voltage command value calculation unit 73 based on the U-phase voltage command value. Vua* and V-phase voltage command value Vva* which are calculated by d-q/three-phase A/C coordinate transformation unit 72. That is, the U-phase voltage command value Vua* and V-phase voltage command value Vva* have been input to the W-phase voltage command value calculation unit 73 from the d-q/three-phase A/C coordinate transformation unit 72. The W-phase voltage command value calculation unit 73 obtains the W-phase voltage command value Vwa* by subtracting the U-phase voltage command value Vua* and V-phase voltage command value Vva* from zero.

The W-phase voltage command value Vwa* calculated by the W-phase voltage command value calculation unit 73 is provided for the three-phase PWM modulation unit 51, similarly to the U-phase voltage command value Vua* and V-phase voltage command value Vva*. The three-phase PWM modulation unit 51 respectively creates PWM signals Su, Sv and Sw corresponding to the U-phase voltage command value Vua*, V-phase voltage command value Vva* and the W-phase voltage command value Vwa*, and the created PWM signals Su, Sv and Sw are output to the motor driver 52. In this manner, voltages Vua, Vva and Vwa respectively corresponding to the PWM signals Su, Sv and Sw are applied to the U-phase. V-phase and W-phase of the motor M from the motor drive 52, and thereby torques required for steering assistance are produced from the motor M.

The power supply voltage is input, to the controller C from a battery power supply 1 of a vehicle. The controller C includes a power supply voltage detection means 2, a power supply voltage drop determination means 3, a failure determination prohibition means 4 and a failure determination means 5. The power supply voltage detection means 2 detects a voltage value of the battery power supply 1 of the vehicle, which is supplied to a constant voltage circuit for the in-vehicle motor control device, that is, the controller C, and a circuit unit (not illustrated) including voltage control means in the periphery thereof. The power supply voltage drop determination means 3 determines the drop in the voltage value of the battery power supply 1 of the vehicle, which is supplied to the motor control device of the vehicle, and transmits signals to the above-described three-phase PWM modulation unit 51.

The failure determination prohibition means 4 determines whether or not the respective configuring circuit components of the controller C are in an operable voltage range based on at least the detected voltage value of the power supply voltage detection means 2, and transmits the signals to the failure determination means 5 when it is determined that the components are beyond the operable voltage range.

In FIG. 2, the motor driver 52, three-phase PWM modulation unit 51, W-phase voltage command value calculation unit 73, d-q/three-phase A/C coordinate transformation unit 72, d-axis current PI control unit 69$d$, q-axis current PI control unit 69$q$, and subtraction units 67$d$ and 67$q$ are collectively referred to as voltage control means 100.

In order to determine whether or not the target current command value I'a* specified by the target current calculation unit 61 and a convergence correction value Ico* are added to each other in the addition unit 62, and the target current specified value Iqa* after the convergence correction, which is subjected to the d-q coordinate transformation, accurately flows to the motor M, a three-phase current detection value determination unit 101 is disposed at the motor control device. In order to perform the determination based on all the phase currents of the three-phase current detection value flowing to the motor M, a motor current detection unit 41 is disposed which is configured to have a U-phase current detection unit 41$u$ detecting the u-phase current, a V-phase current detection unit 41$v$ detecting the V-phase current and a W-phase current detection unit 41$w$ detecting the W-phase current.

The three-phase current detection value determination unit 101 is configured to have a U-phase current detection value determination unit 101$u$ for determining the failure of the motor control device, using a U-phase current detection value Iua, a V-phase current detection value determination unit 101$v$ for determining the failure of the motor control device, using a V-phase current detection value Iva, and a W-phase current detection value determination unit 101$w$ for detecting the failure of the motor control device, using W-phase current detection value Iwa.

In a case where at least one am three-phase current detection values iua, iva and iwa input to the three-phase current detection value determination unit 101 is detected to be beyond a predetermined permissible range, the result is transmitted to the failure determination means 5 and the failure determination means 5 determines whether or not the motor control device has the failure. The g-axis current command value iqa* and the d-axis current command value ida*, the d-axis current detection value Ida and the q-axis current detection value Iqa are also similarly transmitted to the failure determination means 5. Then, if the difference of the d-axis current detection value Ida or the q-axis current detection value Iqa from the d-axis current command value ida* and the q-axis current command value iqa* is a specified failure determination value or more, the motor control device is determined as the failure.

Figure 3:
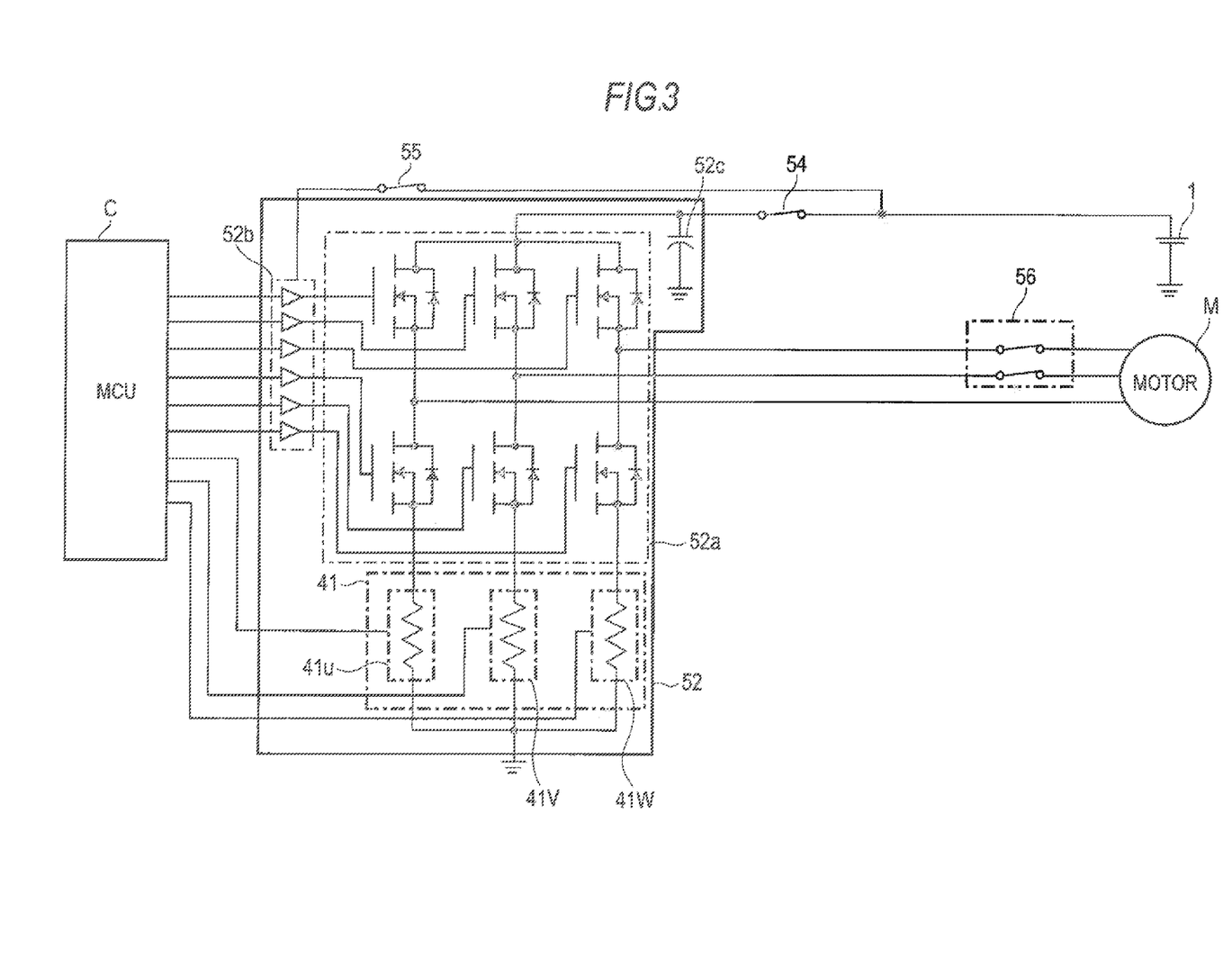
FIG. 3 is a detailed electric circuit diagram illustrating a functional configuration of a motor driver, a controller and a motor in FIG. 2.

FIG. 3 is a detailed electric circuit diagram illustrating a functional configuration of the above-described motor driver 52, the controller C and the motor M. The PWM signals Su, Sv and Sw output from the controller C are sent, via a pre-driver 52$b$ included in the motor driver 52, to a control terminal of six switching elements configuring a bridge circuit 52$a$ for controlling the three-phase current flowing to the motor M. The bridge circuit 52$a$, the pre-driver 52$b$ and a pole capacitor 52$c$ receives the power supply from an identical power supply 1, and are provided with switches 54 and 55 respectively for switching on and off the power supply to the motor driver 52, or a switch 56 for switching on and off the power supply to the motor M.

The motor current detection unit 41 formed from a current detecting resistor is arranged at a common side of the switching elements connected to a negative side of a DC voltage. As the current detection means, the U-phase current detection unit 41$u$, the V-phase current detection unit 41$v$ and the W-phase current detection unit 41$w$ are arranged.

Figure 4:
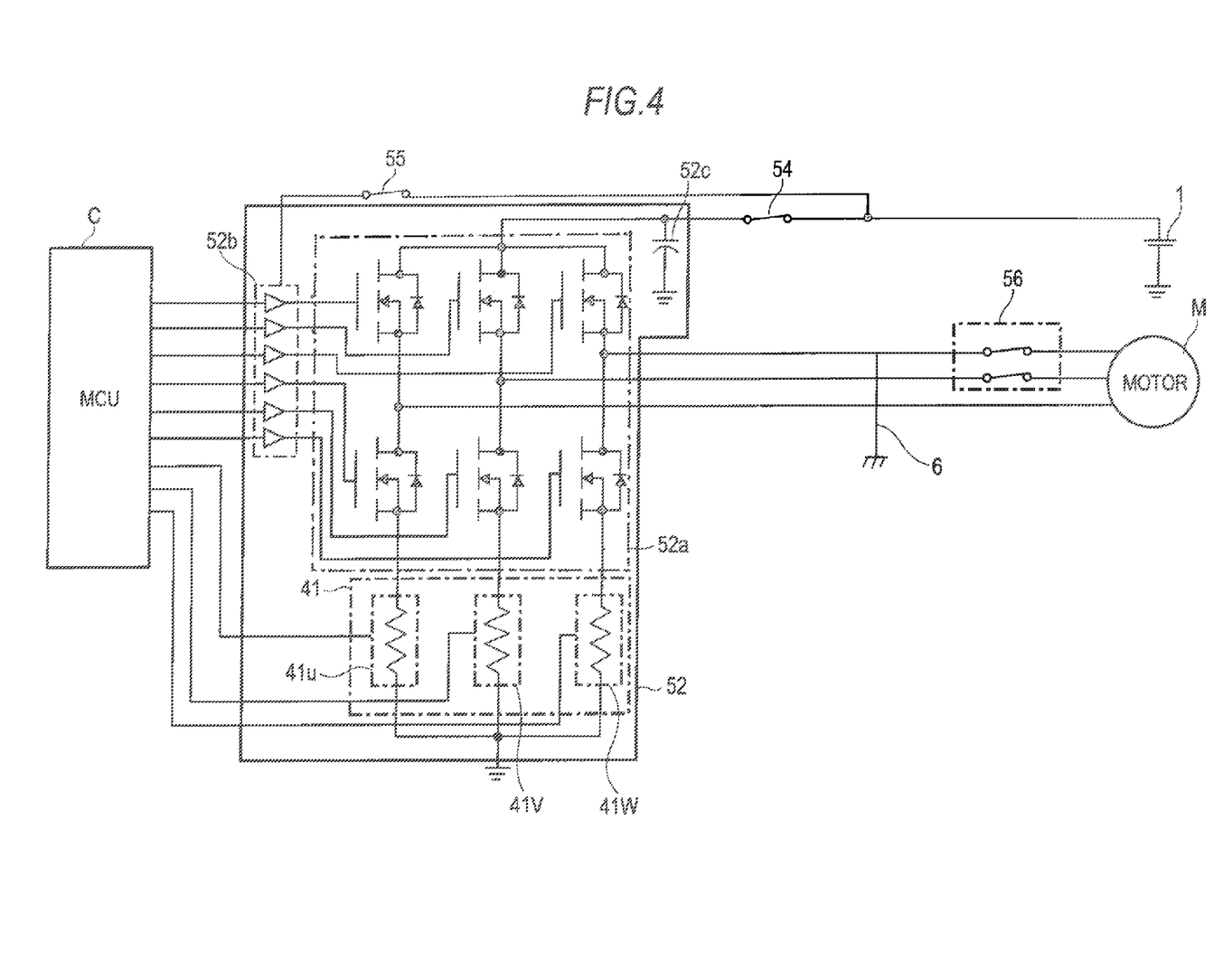
FIG. 4 is a circuit diagram illustrating a condition when a short circuit failure occurs, in the circuit of FIG. 3.

FIG. 4 is a circuit diagram illustrating an example when the failure occurs, and illustrates a case where there occurs a ground failure in a path of a ground cable 6 due to the failure of the W-phase of the motor in the electric circuit of FIG. 3. In this case, the phase current of the motor normally flowing in the W-phase is detected since the current passes through the W-phase current detection unit 41$w$. However, since there occurs the ground failure in the path of the ground cable 6, without passing through the W-phase current detection unit 41$w$, the current is detected as a current value close to zero by the W-phase current detection value determination unit 101$w$.

At this time, the voltage control means 100 is operated to increase the U-phase and V-phase voltages in order for the above-described current value to become the initial target current value, and is controlled to increase the PWM duty ratio of the U-phase and V-phase. This increases the drive current of the electric power steering control device, which is supplied from the battery power supply 1, the controller controlling it, a circuit unit including the voltage control means in the periphery thereof (hereinafter, referred to as a control circuit unit). As a result, the voltage increasingly falls and the power supply voltage input to the above-described constant voltage circuit for the controller C and the circuit unit including the voltage control means in the periphery thereof is decreased.

Herein, an operation of Embodiment 1 of the present invention will be described with reference to FIG. 5 and according to the flowchart indicating the process content or the controller C.

Figure 5:
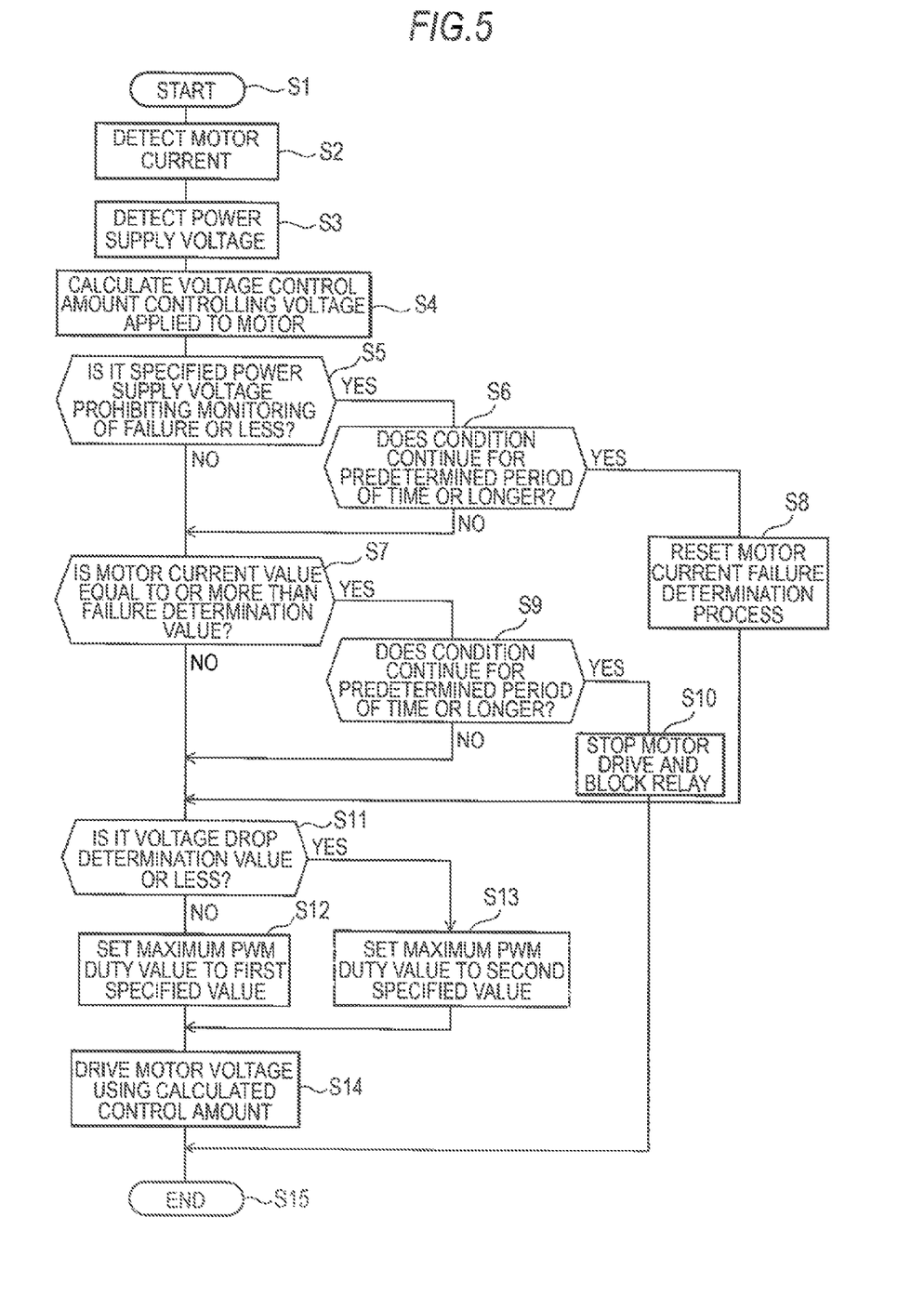
FIG. 5 is a flowchart illustrating process content of a controller according to Embodiment 1 of the present invention.

In FIG. 5 if the control starts in S1 first, the motor current detection unit 41 detects the motor current in S2. The U-phase current detection unit 41$u$, V-phase current detection unit 41$v$ and W-phase current detection unit 41$w$ as the current detection means detects all the phase currents of the three phase current detection value flowing to the motor M. Further, in a case of a brush type motor, it is of course apparent that the motor current of the brush type motor can be detected by the current detection unit with a simpler single phase.

In S3, the power supply voltage is detected and for example, the detection voltage value corresponding to the power supply voltage value is A/D-transformed by the power supply voltage detection means 2 to be read as the power supply voltage detection value.

In S4, based on the information such as the vehicle speed V using the vehicle speed sensor 42, the steering torque T which is detected by the torque sensor 43 and phase-compensated through the phase compensation circuit 44, and the rotor angle θre of the motor M detected by the resolver R and the rotor angle detection circuit 45 which are connected to the motor M input to the above-described controller the voltages Vua, Vva and Vwa corresponding to the PWM signals Su, Sv and Sw are respectively applied from the motor driver 52 to the U-phase, V-phase and W-phase of the motor M via the operation of the above-described voltage control circuit 100. Then, a voltage control amount for controlling the voltage to be applied to the motor is calculated in order for the motor M to generate the torque required for the steering assistance.

In S5, it is determined whether or not the controller C and the configuring circuit components in the periphery thereof are in the operable voltage range based on the detected voltage value of the power supply voltage detection means 2. For example, the minimum operation guarantee voltage value of the calculation amplifier (not illustrated) and its power supply circuit which configure the current detection circuit is generally 8V or higher. Accordingly, in a case of 8V or lower, the process proceeds to S6 and in S6, proceeds to S8 in a case where the voltage continues for the specified period of time or longer. Then, the current failure determination process is reset by the motor S8 and the process proceeds to S11. Furthermore, although not illustrated, it is of course apparent that the drive of the motor may be stopped when necessary.

If the result is NO in S5, and if the result is NO in S6, the process proceeds to S7 where the failure determination unit 5 determines whether or not the motor current value detected by the three-phase current detection value determination unit 101 is the failure determination value or more. Even if the motor M is a brush type motor or a motor driven using the three-phase A/C current, if the detected motor current detection value is the specified failure determination value or more, the process proceeds to S9, and then if the condition of the failure determination value or more continues for a predetermined period of time or longer, the above-described failure determination means 5 determines the failure, the process proceeds to S10 where the motor drive is stopped the relay is blocked and the process proceeds to S15.

In addition, the failure determination means 5 compares the d-axis current command value and q-axis current command value which are set by the d-q command value setting means with the d-axis current detection value and q-axis current detection value which are output from the three-phase/d-q axis transformation means. Then, it the difference is the specified failure determination value or more, the process proceeds to S9. If a condition of the specified failure determination value or more continues for a predetermined period of time or longer, the above-described failure determination means 5 determines the failure, and the process proceeds to S10 where the motor drive is stopped, the relay is blocked and the process proceeds to S15. In S7 and S8, if it is determined as NO, the process proceeds to S11.

S11 is a step where in the failure condition such as the short circuit failure in the armature winding of the motor, and the ground failure in the wire between the control device and the motor, if the overcurrent flows, and thereby the power supply voltage drop occurs due to the overcurrent, it is determined whether or not the drop is the voltage drop determination value or less. This configures features of the present invention. Here, first, an operation waveform of the power supply voltage in a case where there is no determination in S11 and no operation thereof, that is, in a case where the present invention is not applied will be described.

Figure 6:
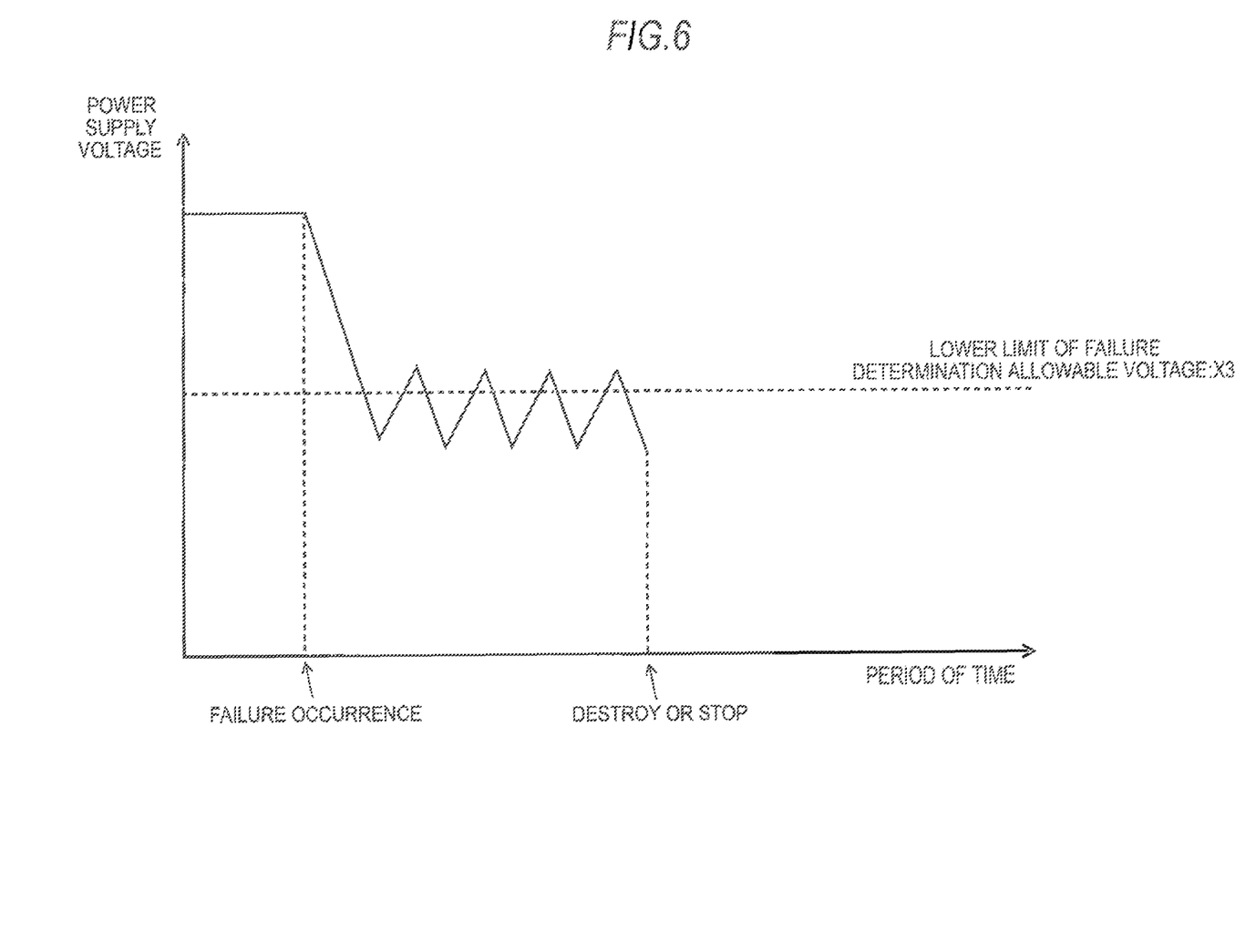
FIG. 6 is an operation waveform diagram of a power supply voltage in a case where the present invention is not embodied.

FIG. 6 illustrates the operation waveform of the power supply voltage in a case where the present invention is not applied. A case is assumed where the ground failure occurs in the path of the ground cable 6 due to the failure in the W-phase simultaneously with failure occurrence.

In this case, the phase current of the motor normally flowing in the W-phase is detected since the current passes through the W-phase current detection unit 41w. However, since there is the ground failure in the path of the ground cable 6, without passing through the W-phase current detection unit 41w, the current is detected as a current value close to zero by the W-phase current detection value determination unit 101w. The voltage control means 100 is operated to increase the U-phase and V-phase voltages in order for the current value to become the initial target current value, and is controlled to increase the PWM duty ratio of the U-phase and V-phase.

This increases the drive current of the control circuit unit, which is supplied from the battery power supply 1. The increase in the current supply causes the increase in the voltage fall, and thereby the power supply voltage drops which is input to the controller C and the respective configuring circuit components in the periphery thereof. If the failure is not cleared, the drive current of the control circuit unit, which is supplied from the battery power supply 1, is increased and thereby the power supply voltage input to the controller C and the respective configuring circuit components in the periphery thereof drops down to the lower limit of the failure determination allowable voltage or less. If so, it is determined as YES in S5 and S6. Then, in S8, the motor current failure determination process is reset to drive the motor without being determined as the failure.

As a result, the switching elements are destroyed in an instant or the dropped voltage stops the operation of the motor control device. Accordingly, the motor current is stopped and the voltage fall is decreased such that the power supply voltage returns to a value beyond the above-described lower limit of the failure determination allowable voltage. However, if the operation of the motor control device is re-started, the drive current of the control circuit unit, which is supplied from the battery power supply is increased and thereby the power supply voltage drops down to a lower limit X3 of the failure determination allowable voltage or less. Further, in a case where the failure determination prohibition means 4 determines the lower limit X3 of the failure determination allowable voltage or less, the result is sent to the failure determination means 5 to prohibit the failure determination of the motor control device. This cycle is repeated until the switching elements driving the motor are destroyed or stopped.

Figure 8:
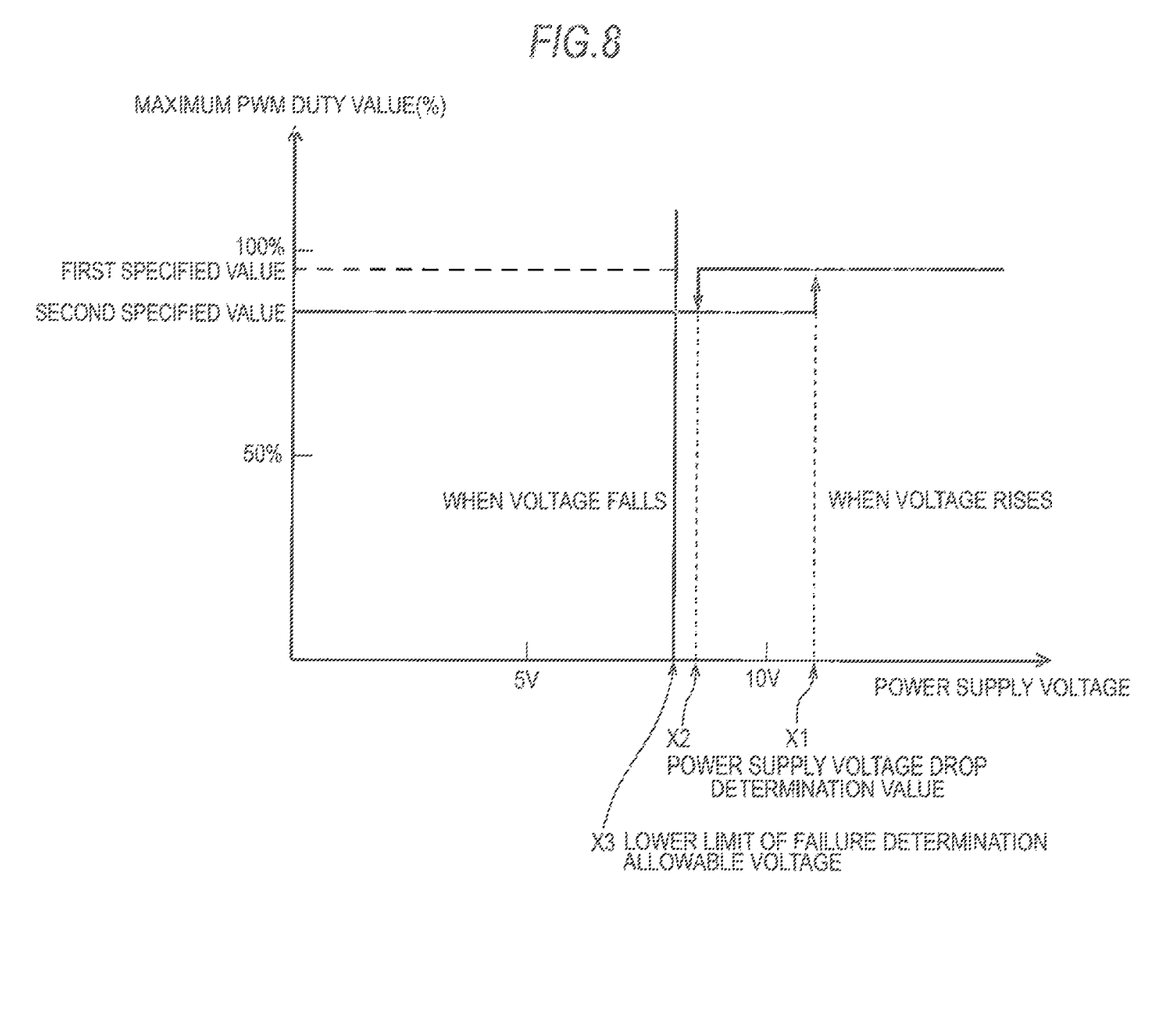
FIG. 8 illustrates a control characteristic diagram of the maximum value (%) of a drive duty ratio in a PWM circuit when determining power supply voltage drop according to Embodiment 1 of the present invention.

Embodiment 1 of the present invention is made to solve such problems, and herein the subsequent steps after S11 in FIG. 5 will be described with reference to FIG. 8. FIG. 8 illustrates a setting method of the maximum value (%) of the drive duty ratio in the PWM circuit when determining the power supply voltage drop according to Embodiment 1 of the present invention. In S11, it is first determined whether or not the power supply voltage is the voltage drop determination value of less. As illustrated in FIG. 8, when the voltage rises, the result is determined as NO, since the determination is a power supply voltage drop determination value X1 or more when the voltage rises. Then, in S12, the maximum PWM duty value is set to the first specified value, and in S14, the motor voltage is driven using the calculated amount.

On the other hand, when the voltage falls, the result is determined as YES, since the determination is a power supply voltage drop determination value X2 or less when the voltage fails. Then, in S13, the maximum PWM duty value is set to the second specified value which is smaller than the first specified value, and in S14, the motor voltage is driven using the calculated amount. Here, it is of course apparent that a similar operation can be expected even though the first specified value is 100% which is the maximum PWM duty value.

The above-described operations in S11 to S14 are performed using the power supply voltage drop determination unit 3 of the controller C and the three-phase PWM modulation unit 51.

The power source voltage drop determination unit determines the power supply voltage drop determination values X1 and X2 in FIG. 8, and sends the result to the three-phase PWM modulation unit 51. The three-phase PWM modulation unit 51 limits the maximum value of the drive duty ratio in the PWM circuit to the first specified value, when the power supply voltage rises, and controls the maximum PWM duty value so as to limit the maximum value of the drive duty ratio in the PWM circuit to the second specified value which is smaller than the first specified value, when the power supply voltage falls.

Figure 7:
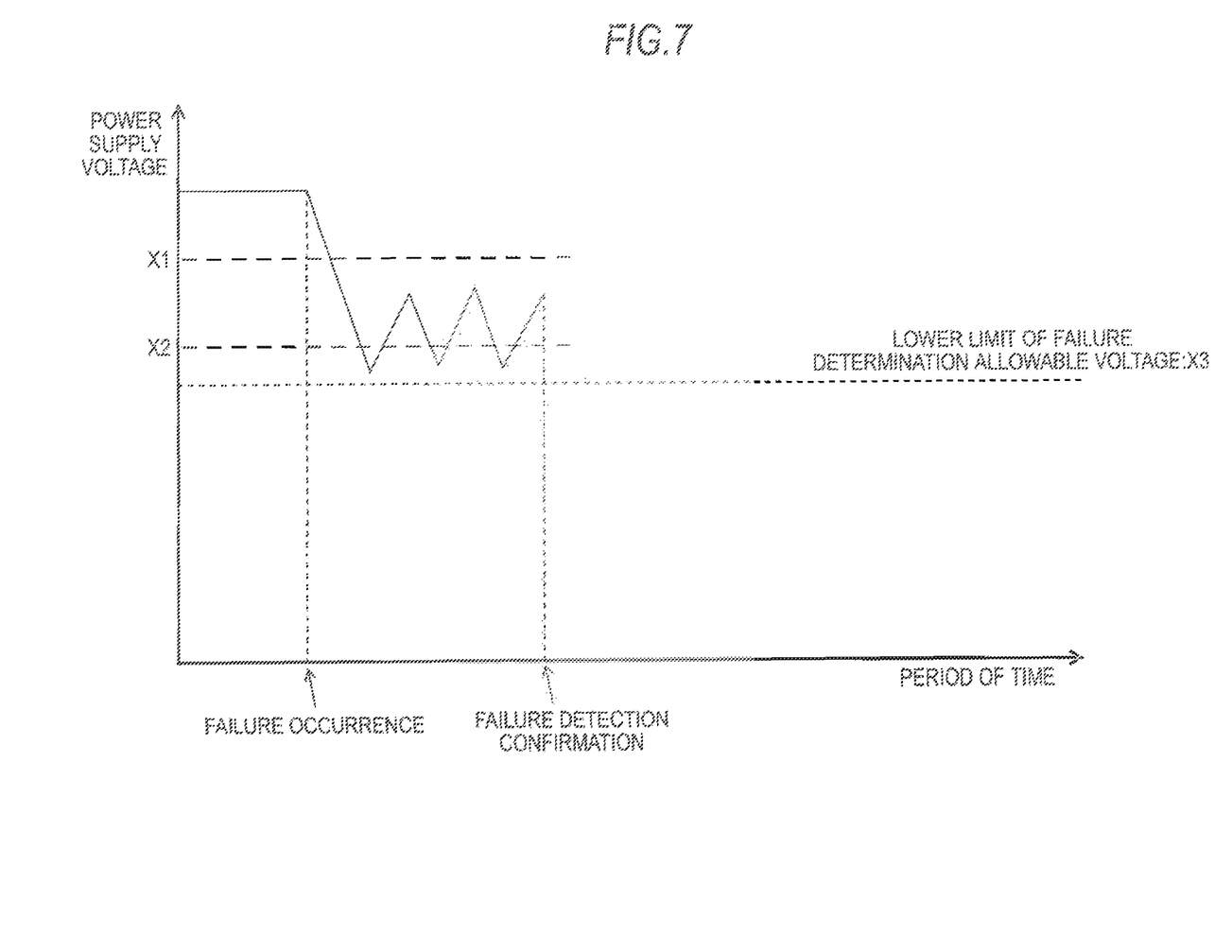
FIG. 7 is an operation waveform diagram of a power supply voltage in a case where the present invention is embodied.

FIG. 7 illustrates an operation waveform of the power supply voltage in a case where the present invention is applied. The power supply voltage of a horizontal axis in FIG. 8 is the same as the power supply voltage of a vertical axis in FIG. 7. The relation among the lower limit X3 of the failure determination allowable voltage in FIG. 7, X1 and X2 in FIG. 8 are expressed by X3<X2<X1. When the voltage rises in FIG. 7, X1 is set to the maximum value or more when the voltage falls. As described above, it is assumed that the ground failure occurs in the path of the ground cable 6 due to the failure in the W-phase simultaneously with failure occurrence. In this case, the phase current of the motor flowing in the W-phase, without passing through the W-phase current detection unit 41w, is detected as a current value close to zero by the W-phase current detection value determination unit 101w.

The voltage control means 100 is operated to increase the U-phase and V-phase voltages in order for the current value to become the initial target current value, and is controlled to increase the PWM duty ratio of the U-phase and V-phase. This increases the drive current of the control circuit unit, which is supplied from the battery power supply 1 and the increased current supply causes the increase in the voltage fall such that the power supply voltage input to the controller C drops.

If the power supply voltage drops, the maximum value of the PWM duty ratio is limited to the second specified value in FIG. 8 by the operation in the embodiment of the present invention, which is described in S14 after S11 in FIG. 5. Accordingly, the maximum value is limited to a smaller motor current value compared to FIG. 6. This also limits the voltage fall to control the motor current in a state where the voltage does not drop down to the lower limit of the failure determination allowable voltage. Then, in S7, S9 and S10, the failure detection is confirmed, the motor drive is stopped and the relay is blocked. Therefore, there is an advantageous effect which can prevent the switching elements of the motor control device from being destroyed.

In the above-described embodiment, an example of the failure determination has been described based on the W-phase ground failure. However, it is of course apparent that the same failure detection can be performed even in the case of the V-phase or U-phase ground failure.

In addition, it is also of course apparent that the same failure detection can be performed in a case of a W-phase short circuit failure to the battery power supply, the V-phase or U-phase short circuit failure to the battery power supply, or otherwise in a case of a short circuit failure between two-phases such as The W-phase and V-phase.

REFERENCE SIGNS LIST

C controller
M motor
R resolver
1 battery power supply
2 power supply voltage detection means
3 power supply voltage drop determination means
4 failure determination prohibition means
5 failure determination means
41 motor current detection unit
41u U-phase current detection unit
41v V-phase current detection unit
41w W-phase current detection unit
42 vehicle speed sensor
43 torque sensor
44 phase compensation circuit
45 rotor angle detection circuit
51 three-phase PWM modulation unit
52 motor driver
52a bridge circuit
52b pre-driver
52c pole capacitor
61, 81 target current calculation unit
64, 82 convergence value correction unit
66 q-axis current command value calculation unit
68 three-phase A/C/d-q coordinate transformation unit
69d d-axis current PI control unit
69q q-axis current PI control unit
72 d-q/three-phase A/C coordinate transformation unit
73 W-phase voltage command value calculation unit
101 three-phase current detection value determination unit
101u U-phase current detection value determination unit
101v V-phase current detection value determination unit
101w W-phase current detection value determination unit

The invention claimed is:

1. A motor control device comprising:
motor drive means for driving a motor;
a PWM modulation unit that detects a motor current; and
a controller to which a motor current detection value using motor current detection means is input and which outputs a drive signal to the motor drive means,
wherein the controller includes power supply voltage detection means for detecting a power supply voltage, a power supply voltage drop determination means for determining power supply voltage drop, and the PWM modulation unit that supplies the motor current to the motor drive means using PWM modulation,
wherein in order to control the motor drive means, the power supply voltage drop determination means determines whether or not the power supply voltage is a predetermined voltage drop determination value or less, sets the maximum value of a PWM duty ratio to a first specified value when the power supply voltage is the predetermined voltage drop determination value or more, and sets the maximum value of the PWM duty ratio to a second specified value which is smaller than the first specified value when the power supply voltage is the predetermined voltage drop determination value or less.

2. The motor control device according to claim 1,
wherein the PWM modulation unit limits the maximum value of a drive duty ratio in a PWM circuit to the first specified value, when the power supply voltage rises, and limits the maximum value of the drive duty ratio in the PWM circuit to the second specified value which is smaller than the first specified value, when the power supply voltage falls.

3. The motor control device according to claim 2,
wherein the power supply voltage drop determination value when the power supply voltage rises is larger than the power supply voltage drop determination value when the power supply voltage falls.

4. The motor control device according to claim 1, further comprising:
failure determination prohibition means for prohibiting monitoring of the failure in case of a specified power supply voltage.

5. The motor control device according to claim 1, further comprising:
a controller that drives using a three-phase A/C current;
current detection means for detecting a phase current actually flowing to a three-phase motor; and
failure determination means for determining the failure when a phase current detection value is beyond a predetermined permissible range.

6. The motor control device according to claim 1, further comprising:
- d-q command value setting means for setting a d-axis current command value and a q-axis current command value in a d-q coordinate system, as a current to be provided for the motor;
- current detection means for detecting the phase current actually flowing to the motor;
- three phase/d-q axis transformation means for transforming a phase current detection value detected by the current detection means into a d-axis current detect ion value and a q-axis current detection value in the d-q coordinate system; and
- voltage control means for controlling a voltage to be applied to the motor, based on the d-axis current command value and the q-axis current command value which are set by the d-q command value setting means, and the d-axis current detection value and the q-axis current detection value which are output from the three phase/d-q axis transformation means.

7. The motor control device according to claim 6, further comprising:
- failure determination means for determining the failure, based on either a difference of the d-axis current detection value from the d-axis current command value or a difference of the q-axis current detection value from the q-axis current command value.

\* \* \* \* \*